United States Patent Office 3,140,345
Patented July 7, 1964

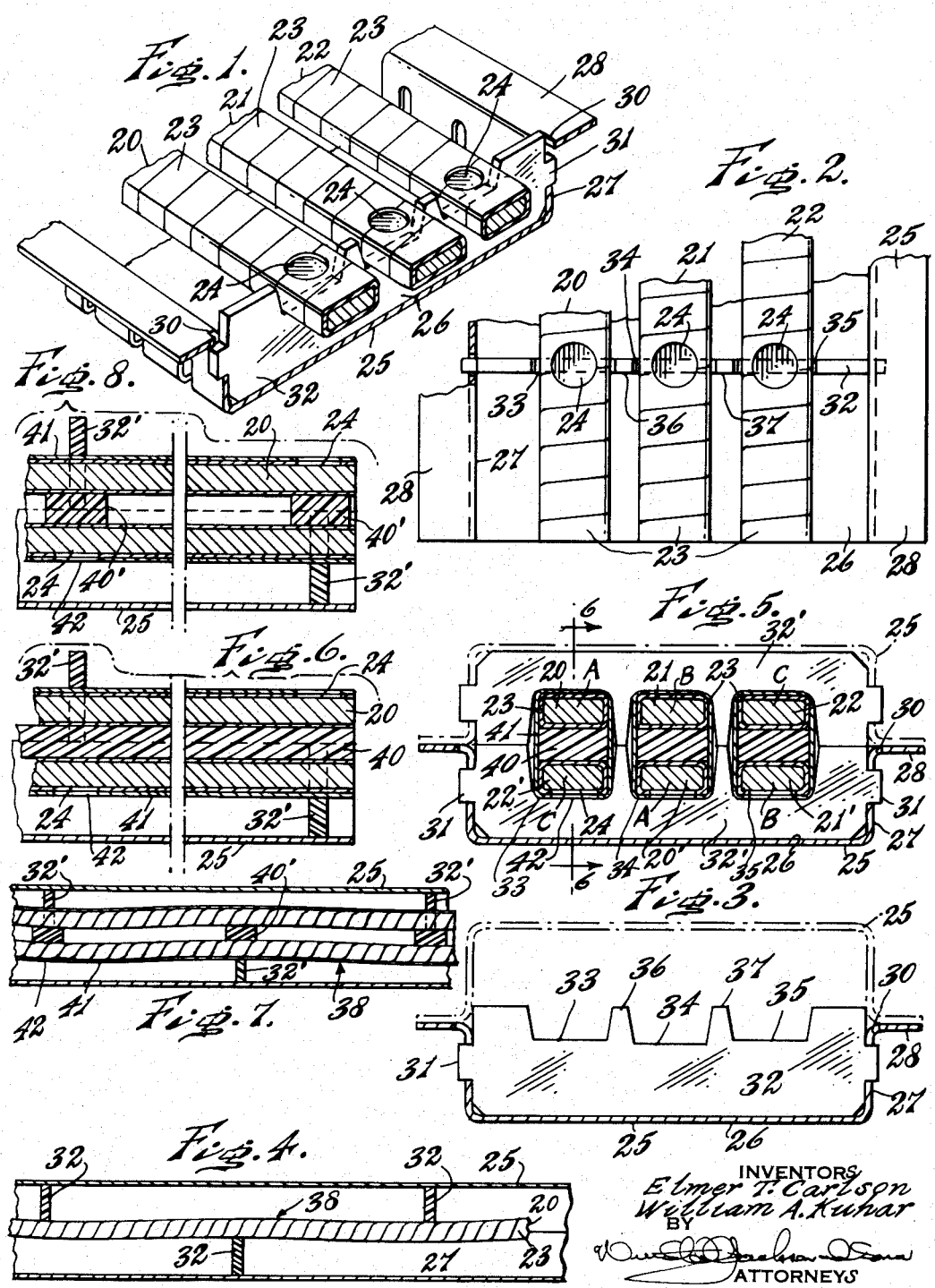

3,140,345
BUS DUCT
William A. Kuhar, Bethlehem, and Elmer T. Carlson, Center Valley, Pa., assignors, by mesne assignments, to Cutler-Hammer, Inc., Milwaukee, Wis., a corporation of Delaware
Filed May 17, 1961, Ser. No. 110,827
2 Claims. (Cl. 174—99)

The present invention relates to bus ducts of the character which are employed for transmitting current in industrial plants, office buildings and other relatively large installations.

A purpose of the invention is to increase the spacing between the bus bars and ground, and particularly to avoid the presence of steel brackets or other metallic grounded members in intimate association with the conductors as in prior art constructions.

A further purpose is to produce a bus duct which is more resistant to impact.

A further purpose is to obtain a stronger insulation support of bus bars in a bus duct.

A further purpose is to employ residual stress in the bus bars themselves to anchor the bus bars and the insulation in the housings.

A further purpose is to better support against the pressure applied by plug-in contacts against bus bars.

A further purpose is to have one bus duct housing half lock an insulator in an opposing bus duct housing half.

A further purpose is to obtain greater resistance to mechanical forces incident to electric currents by pairing the phases and wrapping the paired phase conductors with insulation.

Further purposes appear in the specification and in the claims.

In the drawings we have chosen to illustrate a few only of the numerous embodiments in which the invention may appear, selecting the forms shown from the standpoints of convenience in illustration, satisfactory operation and clear demonstration of the principles involved.

FIGURE 1 is a fragmentary perspective of a bus duct half according to the invention illustrating one insulating strip in its relation to a single set of bus bars.

FIGURE 2 is a fragmentary plan view of the structure of FIGURE 1.

FIGURE 3 is a transverse section of the structure of FIGURES 1 and 2, omitting the bus bars and showing the opposite housing half in skeleton.

FIGURE 4 is a longitudinal section of the assembled bus duct of FIGURES 1 to 3.

FIGURE 5 shows in transverse section a modified form of the bus duct of the invention, partly in skeleton.

FIGURE 6 is a fragmentary section on the line 6—6 of FIGURE 5, omitting one housing half.

FIGURE 7 is a side elevation broken away to show the staggered relation of the insulators.

FIGURE 8 is a view similar to FIGURE 6 showing a variation.

Describing in illustration but not in limitation and referring to the drawings:

In the prior art bus ducts have employed insulation which has usually been supported on metallic brackets or other grounded metallic members which thus come rather close to the conductors. The present invention is designed particularly to provide greater spacing between grounded metallic elements such as brackets and the bus bars so as to improve the electrical properties.

A further advantage of the invention is that the bus duct is rendered much more resistant to impact and other shock, which might be encountered either by dropping the busway itself or by striking it with other parts incident to an explosion, or by a falling object.

The device of the invention also greatly increases the mechanical force capable of holding the conductors in proper position under conditions of short circuit.

One of the great advantages of the invention is that residual stress in the bus bars themselves is used to increase the strength of anchorage, the bus bars constantly resiliently urging against the edge of the insulating strips, which, since they are placed on edge and have their major dimension transverse to the bus bars, have great depth of section and are very effective in resisting load.

The invention also makes it possible to use an insulating material of superior electrical properties as well as excellent physical properties.

The simplicity of assembly, by which the insulating strips merely need to be dropped into slots, greatly reduces the cost of the construction, the time of assembly being cut down by about 25%.

In the preferred embodiment of the invention, the insulating strips from the opposite sides are staggered along the bus duct, there being one insulating strip at each position where plug-in connection can be made. The relatively thin dimension of the bus bar is located in the direction in which the insulating strip presses against the bus bar, so that the bus bar can readily deflect into a wave formation which automatically tends to prevent tipping or tilting of the insulator in either direction due to the pressure of the bus bars against the insulating strip.

Considering now the drawings in detail, we illustrate in FIGURES 1 to 4 bus bars 20, 21, and 22 each of which is individually wrapped with insulating tape 23, suitably fire resistant polyvinylchloride tape, the bus bars have certain contact points 24 which are exposed by cutting out the insulation as shown. The bus bars will suitably be of copper or aluminum as well known, and the contact points 24 may be silver plated if desired.

The bus bars have their long cross-sectional dimension in the plane of the group of bus bars and their thin cross-sectional dimension transverse to the plane of the group of bus bars.

The bus bars are surrounded by housing halves 25 which are opposite counterparts and suitably consist of steel. The housing halves are in spaced relation to the bus bars and include a relatively flat body portion 26, sides 27 at right angles to the body portion and flanges 28 diverging and parallel to the body portion and united to the opposite bus duct housing half by suitable fasteners not shown.

At intervals along each housing half, there are slots 30 through the portion of the flange adjoining the side 27 and through the side 27 to a suitable depth to receive end projections 31 of insulating strips 32.

The insulating strips are placed on edge so that their narrow dimension is in the direction of length of the bus bars and their wide cross sectional dimension is transverse to the direction of length of the bus bars so that there will be a great depth of section.

The insulation used is of high electrical and mechanical properties, preferably fiberglass base polyester insulation of NEMA grade GPO-1 which has the following typical properties:

| | |
|---|---|
| Tensile strength | 12,000 p.s.i. |
| Compression strength | 30,000 p.s.i. |
| Flexural strength | 20,300 p.s.i. |
| Rockwell hardness | 75. |
| Dielectric strength | 500 volts per mil. |
| Arc resistance | 100 seconds. |
| Heat resistance | 150° C. |
| Water absorption | 0.30%. |

Self-extinguishing in flame.
Chemical effect:

| | |
|---|---|
| Weak acids | none. |
| Strong acids | some attack. |
| Weak alkalis | slight to none. |
| Strong alkalis | some to severe. |
| Organic solvents | generally none. |

The insulating strips 32 generally conform to the shape of the sides and the base of the housing half and at the portion adjoining the bus bars have recesses 33, 34 and 35 separated by lips 36 and 37 which keep the bus bars apart. The recesses 33, 34 and 35 suitably are wider toward the center and the depth of the recess is such that the center line of the bus bar is forced slightly beyond the center of the housing. The recesses for the outside bus bars may be slightly deeper as shown.

The opposite bus duct half has the insulating strips staggered as best seen in FIGURE 4, and the bus duct halves are assembled under a press or suitable clamp so that the bus ducts are deflected into wave form as indicated at 38, and the wave formation applies residual stress to the bus bars against insulating strips and tends to anchor them firmly against tilting. The wave formation also tends to anchor the bus bars against slipping out of the housing especially when the bus ducts are running vertically.

In assembly if it is desired to invert one of the housing halves, it is desirable to hold the insulating strips in such housing half temporarily during inversion before assembly as by suitable adhesive or by spring clips applied suitably to the projecting ends 31.

Thus, it will be evident that the insulating strips are subjected to residual stress by the bending of the bus bars elastically, but the insulating strips are free to adjust slightly under load as required.

In many cases it is preferable to employ a paired phase relationship of the bus bars in the device of the invention as shown in FIGURES 5 and 6.

In this form, which constitutes the preferred embodiment, bus bars 20 and 20' are connected to phase A, bus bars 21 and 21' are connected to phase B and bus bars 22 and 22' are connected to phase C, with bus bars 20 and 22' paired together, bus bars 21 and 20' paired together and bus bars 22 and 21' paired together, as best seen in FIGURE 5.

Except that the conductors are in paired phase relationship, and accordingly the recesses 33, 34 and 35 in the insulating strips 32' are deeper to allow for the greater thickness of the conductors and the spacing between them, the arrangement will suitably be the same as that of FIGURES 1 to 4, inclusive, with each insulating strip 32' tending to deflect the conductors into a wave when viewed from the side by pushing the center of the conductors past the center of the space within the housing suitably by a distance of from 1/16" to 3/8" in the preferred form.

Each of the paired phase conductors is individually wrapped by insulating tape 23 and the conductors of each pair are separated by an insulating strip 40 suitably an elastic insulating strip such as fiberglass felt which runs continuously between the conductors. The pair of conductors is then wrapped continuously by insulating tape 41 which tends to make the pair of conductors function mechanically together and greatly increases the resistance against mechanical forces on short circuit. The tape 41 at positions opposite to the insulating strips 32' has openings 42 in it opposite the openings 24 so as to permit plug-in connectors which pass through suitable openings in the bus duct housing to engage the conductors on one side at one insulating strip and on the other side opposite the next insulating strip.

In some cases instead of using the continuous insulating layer 40 between the conductors, insulating blocks or units 40' are placed opposite the insulating strips and spaces are left between the paired phase conductors between the locations of insulating strips as shown in FIGURES 7 and 8. FIGURE 7 shows the wave formation of the bus bars.

In operation it will be understood that the bus duct of the invention functions in a manner similar to bus ducts in the prior art except that it has greater electrical and mechanical properties as already explained.

In view of our invention and disclosure variations and modifications to meet individual whim or particular need will doubtless become evident to others skilled in the art, to obtain all or part of the benefits of our invention without copying the structure shown, and we therefore, claim all such insofar as they fall within the reasonable spirit and scope of our claims.

Having thus described our invention what we claim as new and desire to secure by Letters Patent is:

1. In a bus duct, a pair of opposed housing halves, bus bars extending through the housing halves in spaced relation to the latter, insulation strips mounted alternately across each of said housing halves in spaced apart relation and having notches to receive and support the bus bars, said notches in the strips in each housing half opening in the same direction and toward the open ends of the notches in the other housing half, and said notches in said strips being dimensioned so that with said bus bars seated therein the longitudinal center lines of the latter at said strips lie within the opposite housing half so that a wave form is imparted to such bars longitudinally thereof when said housing halves are secured together.

2. In a bus duct, a pair of opposed housing halves, bus bars extending through the housing halves in spaced relation to the latter with their greatest transverse cross sectional dimension parallel with the corresponding dimension of the housing halves, insulating strips formed of a fiberglass based polyester material mounted alternately across said corresponding dimension of said housing halves in spaced apart relation, said strips being relatively narrow across their edges longitudinally of such bus bars and having notches formed in such edges in which said bus bars are supported, said housing halves having slots, and said strips having projections interfitting with the slots to anchor the latter along the transverse and the longitudinal dimensions of said housing halves, and said notches in the strips in each housing half opening in the same direction and toward the open ends of the notches in the other housing half, and said notches in said strips being dimensioned so that with said bus bars seated therein the longitudinal center lines of the latter at said strips lie within the opposite housing half so that a wave form is imparted to such bus bars longitudinally thereof when said housing halves are secured together.

References Cited in the file of this patent

UNITED STATES PATENTS

| | | |
|---|---|---|
| 2,230,423 | Bassette et al. | Feb. 4, 1941 |
| 2,372,267 | Frank et al. | Mar. 27, 1945 |
| 2,407,142 | Cole et al. | Sept. 3, 1946 |
| 2,482,310 | Adam | Sept. 20, 1949 |
| 2,681,392 | Herrmann | June 15, 1954 |
| 2,903,503 | Carlson et al. | Sept. 8, 1959 |

FOREIGN PATENTS

| | | |
|---|---|---|
| 1,241,389 | France | Aug. 8, 1960 |